US010669991B2

(12) United States Patent
Stoltenberg

(10) Patent No.: US 10,669,991 B2
(45) Date of Patent: Jun. 2, 2020

(54) WIND TURBINE AND METHOD FOR OPERATING A WIND TURBINE

(71) Applicant: Senvion GmbH, Hamburg (DE)

(72) Inventor: Henning Stoltenberg, Preetz (DE)

(73) Assignee: Senvion GmbH, Hamburg (DE)

( * ) Notice: Subject to any disclaimer, the term of this patent is extended or adjusted under 35 U.S.C. 154(b) by 0 days.

(21) Appl. No.: 15/939,922

(22) Filed: Mar. 29, 2018

(65) Prior Publication Data

US 2018/0283353 A1    Oct. 4, 2018

(30) Foreign Application Priority Data

Mar. 30, 2017   (DE) .......................... 10 2017 003 220

(51) Int. Cl.
*F03D 7/04* (2006.01)
*F03D 7/02* (2006.01)
*F03D 9/25* (2016.01)

(52) U.S. Cl.
CPC ............. *F03D 7/042* (2013.01); *F03D 7/028* (2013.01); *F03D 7/0272* (2013.01);
(Continued)

(58) Field of Classification Search
CPC ...... F03D 7/0272; F03D 7/0276; F03D 7/028; F03D 7/042; F03D 9/257; F05B 2220/706;
(Continued)

(56) References Cited

U.S. PATENT DOCUMENTS 7,750,490 B2    7/2010  Scholte-Wassink
2012/0133139 A1*  5/2012  Egedal ............... F03D 80/10
290/44

(Continued)

FOREIGN PATENT DOCUMENTS

DE   10 2010 014165    10/2011
DE   10 2013 203540     9/2014
(Continued)

OTHER PUBLICATIONS

Search Report dated Nov. 30, 2017 directed to DE Application No. 10 2017 003 220.3, 2 pages.
(Continued)

*Primary Examiner* — Kidest Bahta
(74) *Attorney, Agent, or Firm* — Morrison & Foerster LLP

(57) ABSTRACT

The invention relates to a wind turbine having a wind rotor, a generator that is driven by the latter and that acts in combination with a converter to generate electrical power, a rotational-speed closed-loop control system and, acting in combination therewith, a power open-loop control system, the rotational-speed closed-loop control system emitting a setpoint rotational-speed signal ($n_{set}$). According to the invention, provided between the rotational-speed closed-loop control system and the power open-loop control system is an offset module, which is designed to generate an offset signal ($n_{offset}$) and to add it to the setpoint rotational-speed signal ($n_{set}$). The wind turbine according to the invention makes it possible to reduce a drop in power following requested additional power. The invention additionally comprises a corresponding method for operating a wind turbine.

13 Claims, 4 Drawing Sheets

(52) U.S. Cl.
CPC ........... *F03D 7/0276* (2013.01); *F03D 9/257* (2017.02); *F05B 2220/706* (2013.01); *F05B 2270/101* (2013.01); *F05B 2270/1033* (2013.01); *Y02E 10/723* (2013.01); *Y02E 10/725* (2013.01)

(58) Field of Classification Search
CPC ....... F05B 2270/101; F05B 2270/1033; Y02E 10/723; Y02E 10/725
See application file for complete search history.

(56) References Cited

U.S. PATENT DOCUMENTS

| | | | |
|---|---|---|---|
| 2013/0026759 A1 | 1/2013 | Krueger et al. | |
| 2013/0177418 A1* | 7/2013 | Hansen | F03D 7/0276 416/1 |
| 2013/0195654 A1* | 8/2013 | Berger | F03D 7/02 416/1 |
| 2013/0294911 A1* | 11/2013 | Egedal | F03D 7/0224 416/1 |
| 2014/0339828 A1* | 11/2014 | Peiffer | F03D 7/048 290/44 |
| 2015/0267686 A1* | 9/2015 | Kjær et al. | F03D 7/0224 290/44 |
| 2016/0027686 A1* | 1/2016 | Nitta | H01L 21/76808 438/618 |

FOREIGN PATENT DOCUMENTS

| | | |
|---|---|---|
| WO | WO-2011/124696 | 10/2011 |
| WO | WO-2016/192731 | 12/2016 |

OTHER PUBLICATIONS

Search Report dated Aug. 16, 2018, directed to EP Application No. 18164187; 4 pages.

* cited by examiner

WIND TURBINE AND METHOD FOR OPERATING A WIND TURBINE

CROSS-REFERENCE TO RELATED APPLICATIONS

This application claims priority to German Application No. 10 2017 003 220.3, filed Mar. 30, 2017, the entire contents of which are incorporated herein by reference.

FIELD OF THE INVENTION

The invention relates to a wind turbine having a wind rotor, a generator that is driven by the latter and that acts in combination with a converter to generate electrical power, a rotational-speed closed-loop control system and, acting in combination therewith, a power open-loop control system, the rotational-speed closed-loop control system emitting a setpoint rotational-speed signal to the power open-loop control system. The invention additionally comprises a corresponding method for operating a wind turbine.

BACKGROUND OF THE INVENTION

With the increasing demands on wind turbines to contribute to grid stabilization in the event of a drop in frequency, there are also growing demands by the grid operators concerning the maximum drop in power following provision of primary control power by the wind turbine. Various methods for providing primary control power are known from the prior art, in which the required primary control power is obtained from the kinetic energy of the rotor.

Known from WO 2011/124696 is a closed-loop control system for wind turbines that provides adequate primary control power even in the case of unsteady wind speeds. In this case, an additional closed-loop control system is provided, which has an input for a desired additional power, and which is designed to generate therefrom a rotational-speed change signal, taking account of a rotor moment of inertia, and to output an output signal that is added to the setpoint rotational-speed signal via a logic element.

A rotational-speed change signal is understood to mean the change in rotational speed over time that results from energy being removed from the inertia mass of the wind rotor. This energy corresponds to the difference between the kinetic energy stored in the inertia mass before and after the change in rotational speed is taken into account. The desired additional power is made available on the basis of the rotational-speed change signal. In this case, the power delivered to the grid by the wind turbine is not controlled by closed-loop control, but instead the energy removed from the inertia mass of the wind rotor is controlled by open-loop control. After the infeeding of the additional power is completed, there is again a changeover to normal operation. This is not effected abruptly, however, but gradually, in order to avoid instabilities in the mechanical and electrical system of the wind turbine.

SUMMARY OF THE INVENTION

Described are systems and methods for reducing a drop in power of a wind turbine following the provision of requested additional power.

According to the invention, provided between the rotational-speed closed-loop control system and the power open-loop control system is an offset module, which is designed to generate an offset signal and to add it to the setpoint rotational-speed signal.

The invention is based on the recognition that an undershoot of power following completion of the provision of additional power can be avoided in that the setpoint rotational-speed signal is provided with an offset signal. The modified setpoint rotational-speed signal results in a lesser drop in the actual rotational speed, and consequently in a reduced drop in power. The wind turbine according to the invention thereby makes it possible to provide a greater additional power for the same power drop.

Firstly, some terms are to be explained:

Requested additional power is understood to mean the desired primary power that is fed in by a wind turbine for the purpose of stabilizing the grid.

The normal state of a wind turbine is understood to mean that state of the wind turbine in which the wind turbine does not provide requested additional power.

The term setpoint rotational-speed signal is to be understood to mean the initial quantity of the rotational-speed closed-loop control system, which is applied as a parameter to the power control system, i.e. to the rotational-speed open-loop control system of the wind turbine, and/or to the generator, or to the converter connected to the generator, for the purpose of setting the rotational speed of the generator. In most cases, this is a setpoint rotational-speed signal itself, but this may also be a setpoint torque signal. The rotational-speed closed-loop control system may likewise act in combination with a blade-pitch controller, such that a particular angle of attack of the rotor blades (pitch angle) can be set in relation to the onflowing wind, in order to achieve a rotational speed of the wind rotor. Such signals are also included under the term "setpoint rotational-speed signal", which is to be understood in a functional sense.

A power open-loop control system is to be understood to mean equipment that controls the output of electrical power by the mechanical-electrical energy converter constituted by the generator and the converter. Usually, it acts directly on the converter, but it is not to be precluded that it also, or alternatively, acts directly on the generator.

In a preferred embodiment of the invention, the offset module is designed to generate the offset signal in dependence on a state value, and in particular the state value describes a normal state or a state of additional power generation. Whereas, in a state of additional power generation, it would be counter-productive to apply a positive offset to the setpoint rotational speed, since this is counter to the provision of power, it may be helpful in normal operation, in order to arrest a falling rotational-speed signal. The offset can thus be used selectively where undershoots of the rotational speed are to be expected, namely, following a state of additional power generation.

In an advantageous embodiment of the invention, the offset signal rises after the state value changes over from a state of additional power generation to a normal state. In order to prevent a further unwanted drop in the rotational speed following the provision of the additional power, a preferably continuously increasing offset is added to the rotational-speed setpoint signal, in order to effect a continuous alteration of the rotational speed. In this way, instabilities in the mechanical and electrical system of the wind turbine can be avoided. During the generation of additional power, the rotational speed decreases; a rising offset, which raises the setpoint rotational speed, would in this case only hinder the provision of additional power.

Preferably, the offset signal has a step-type rise. According to the invention, a step-type or abrupt rise has the result that undershooting of the power is avoided completely, irrespective of whether, following completion of the infeeding of the additional power, by priority the rotational speed rises again or by priority power is generated for feeding into the grid. According to the invention, an abrupt rise in the setpoint rotational speed results in a rising characteristic of the actual rotational speed, and thus in a lesser drop in power.

The offset module preferably comprises a stored power value, and the offset signal rises in dependence on the stored power value. This embodiment of the invention has the result that the level of the offset can be selected according to the initial power. Taking account of a power value in the generation of the offset signal makes it possible to use the offset signal to set a predefined power value in a precise manner, and thus also to avoid overshooting of the rotational speed.

The stored power value advantageously corresponds to a current power value in normal operation of the wind turbine, and is updated upon each changeover of the state value from the normal state to the state of additional power generation. The rise is thus always effected in dependence on a stored power value of the wind turbine that describes the normal operation of the wind turbine, which is also to be reset after additional power has been fed into the grid for a certain period of time. These intervals of time are normally in the range of only a few seconds, such that it is desirable to restore the initial state of the wind turbine following the generation of additional power.

Preferably, the offset module has a timer, which specifies a fixed time interval for the duration of which the offset signal rises, particularly preferably rises continuously. A time limitation on the rise of the offset signal has the advantage that significant overshooting of the rotational speed value is not triggered, and the system remains in a stable state.

Preferably, the time interval defined by the timer does not exceed a duration of 5 seconds, preferably 2 seconds, more preferably 1 second. It has been found that a time duration of a few seconds is sufficient to generate an offset of sufficient magnitude to prevent undershooting of the power.

In a preferred embodiment, the offset signal drops after the timer has elapsed. This enables the actual rotational speed to be continuously approximated to the setpoint rotational speed, without overshoots. In this way, it is ensured that the wind turbine effects a gentle changeover to normal operation.

It may be provided, advantageously, that the offset signal drops to a value that corresponds to the product from the stored power value and a factor. The reduction of the offset to a value that is scaled according to the original power value enables the offset module of the wind turbine to produce a constant reduction of the power drop, despite variable ambient conditions.

According to an advantageous embodiment of the invention, the offset module comprises a slope limiter, which limits the rise and/or the drop of the offset signal. Wind turbines are subjected to large mechanical forces. Limitation of the rate of change of the offset signal is therefore important, in order for forces acting on the wind turbine to be kept within manageable limits. For this purpose, the change in the offset, and therefore in the rotational-speed setpoint signal, is limited. The limitation may be individually adapted for the rise and/or the drop.

The invention further comprises a corresponding method for operating a wind turbine that comprises a wind rotor, a generator that is driven by the latter and that acts in combination with a converter to generate electrical power, a rotational-speed closed-loop control system and, acting in combination therewith, a power open-loop control system, having the following steps: outputting of a setpoint rotational-speed signal by the rotational-speed closed-loop control system, generating an offset signal, adding the offset signal to the setpoint rotational-speed signal, and outputting the modified setpoint rotational-speed signal to the power open-loop control system.

Preferably, the method may be executed by using the wind turbine according to the invention. For a more detailed description, reference is made to the explanation given above.

The method according to the invention can be progressed with features described in connection with the wind turbine according to the invention. The wind turbine according to the invention can be progressed with features described in connection with the method according to the invention.

BRIEF DESCRIPTION OF THE DRAWINGS

The method is described exemplarily in the following with reference to the appended drawings, on the basis of an advantageous embodiment. In the figures.

DETAILED DESCRIPTION OF THE INVENTION

Figure 1:
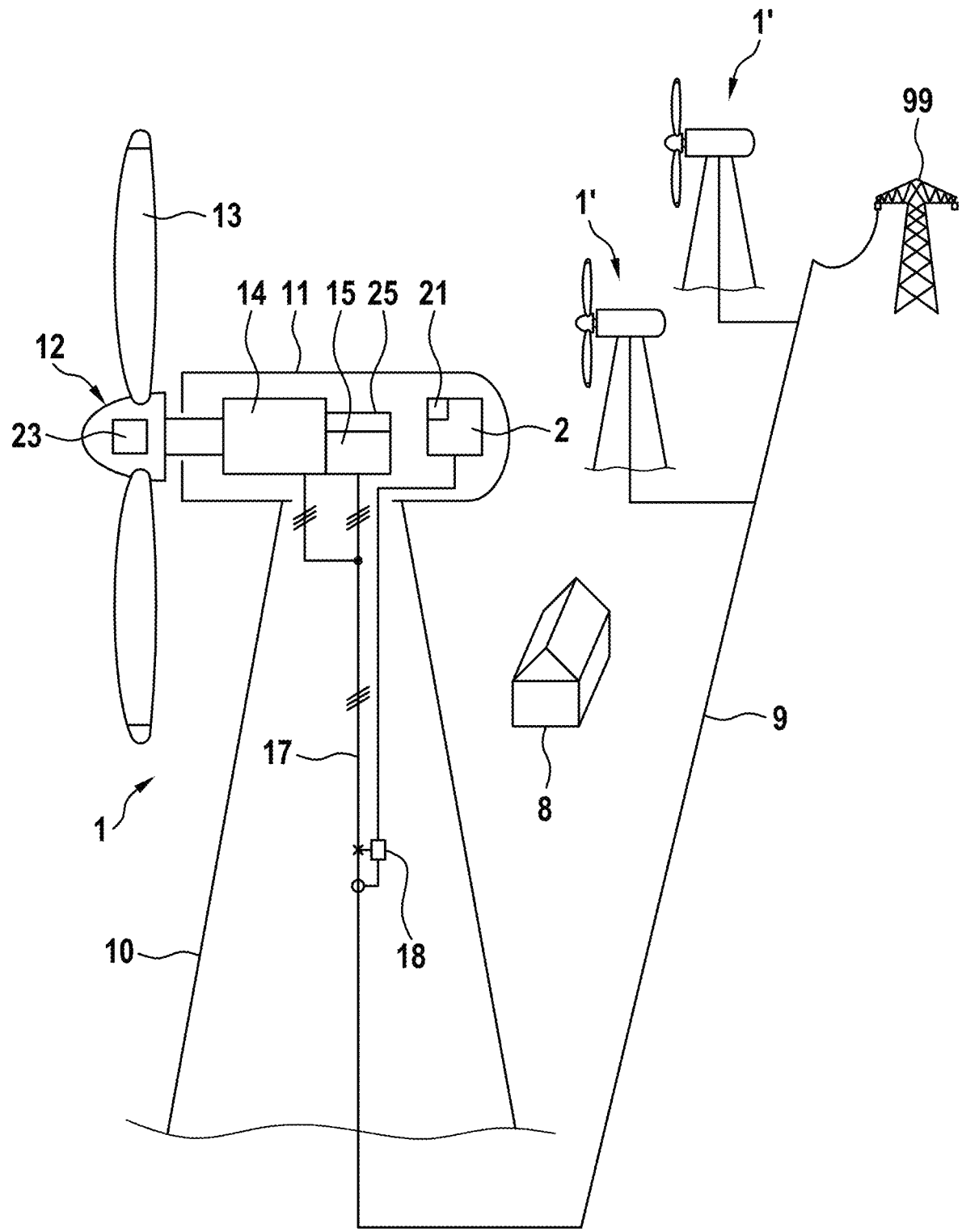
FIG. 1 shows an overview representation of a wind turbine in an exemplary embodiment of the invention.

FIG. 1 shows a wind turbine according to an exemplary embodiment of the invention. The wind turbine comprises a tower 10, at the upper end of which a nacelle 11 is arranged so as to be slewable in the azimuth direction. A wind rotor 12, having a plurality of rotor blades 13 that can be adjusted in respect of their angle of attack, is rotatably mounted on an end face of the nacelle 11. The wind rotor 12, via a rotor shaft, drives a generator 14. The latter, together with a converter 15 connected thereto, generates electrical energy. The line 17 is connected, via a transformer, not shown, to a collector grid 9 that is internal to a wind park. It may also be directly connected, via a transformer, to a medium-voltage or high-voltage grid 99.

The wind turbine additionally comprises an operating open-loop control system 2, which is disposed on the nacelle 11 and which is connected, via communication means (not represented), to a park master 8 of a wind park. The operating open-loop control system 2 comprises, inter alia, the rotational-speed closed-loop control system 21 for the wind rotor 12. The electrical power generated by the wind turbine 1 and output via the line 17 is sensed by a power measuring means 18 and applied to the operating open-loop control system 2.

A park master 8 forms the higher-order control entity for the wind turbines 1, 1' of the wind park, to which it is connected via communication means, not shown. The wind turbines 1' may be of the same type as the wind turbine 1, but this is not an absolute requirement. The electrical energy generated by the various wind turbines is carried, via a collector grid 9 that is internal to the wind park, to a node point, at which the wind park is connected, via a transformer, not represented, to a grid that serves for power transmission.

The rotational-speed governor 21 is a unit of the operating open-loop control system 2, which determines the setpoint value for a rotational speed of the wind rotor 12 and which acts in combination with a power governor 25, in particular a converter governor, in such a manner that such an electrical moment is set in order to achieve the corresponding rotational speed of the wind rotor 12. The rotational-speed governor 25 may likewise act in combination with a blade pitch governor 23, such that a particular angle of attack of the rotor blades (pitch angle) can be set in relation to the onflowing wind, in order to achieve a rotational speed of the wind rotor 12.

Figure 2:
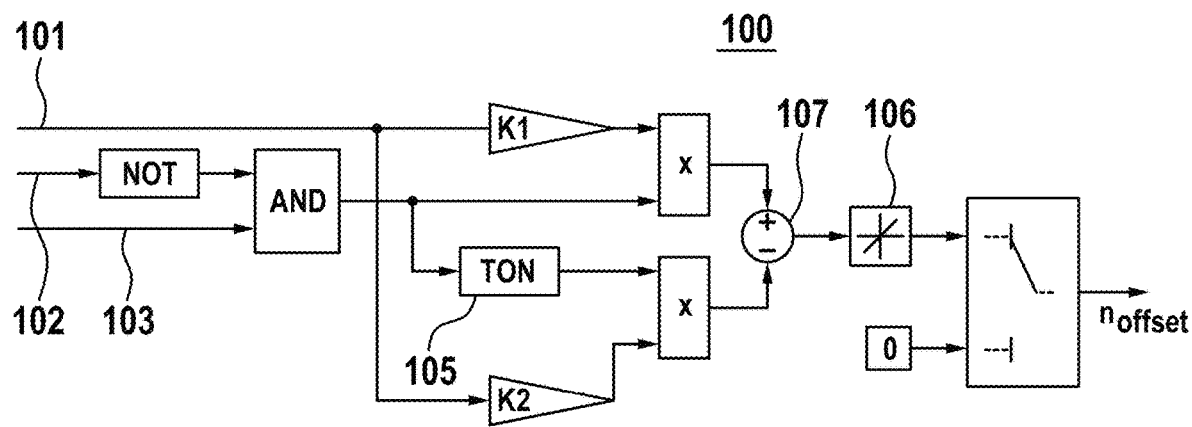
FIG. 2 shows a block diagram of an offset module according to the invention.

FIG. 2 shows an embodiment of the offset module 100 according to the invention. In this embodiment, a stored power value 101, a state value 102 and an activation value 103 are provided as inputs of the offset module 100. The stored power value 101 is a current power value that describes the state of the wind turbine. It can either be permanently read-out and updated, as long as the state value 102 indicates normal operation, or be read out upon a changeover from normal state to the state of additional power generation. In each case, the stored power value represents the power value of the wind turbine before the provision of the requested additional power.

The state value 102 indicates the current state of the wind turbine, the normal state in this case being denoted by a 0 and the state of additional power generation being denoted by 1. Upon changeover to the state of additional power generation, the activation value 103 is also set to 1. Thus, as soon as the activation value 103 is at 1 and the state value 102 is at 0, the timer 105 is started. For as long as the timer 105 has not elapsed, the summation element 107, at the upper input, receives only a value other than 0, namely K1 multiplied by a stored power value 101. Thus, only this value is present at the input of the slope limiter 106. Should the difference of this value, relative to the value previously received there, prove to be greater than the maximum difference allowed by the slope limiter 106, this value is limited to the maximum difference. This occurs until either the value of the state value 101 multiplied by K1 is present at the output of the slope limiter 106, or the timer 105 has elapsed. The output of the slope limiter 106 is output, as $n_{offset}$, at the output of the offset module 100. It follows from this that the signal $n_{offset}$ for this time period is either rising or constant. If the timer 105 has elapsed, then, at the summation element 107, the product from the state value 101 and K2 is subtracted from the product from the state value 101 and K1. This result also is again subject to the limits of the slope limiter 106. Owing to this, following elapsing of the timer 105, the signal $n_{offset}$ is falling. However, the offset signal does not fall below the value zero. The offset module according to the invention additionally has a further control input at the switch (not shown in FIG. 2) that, following completion of the additional power, "releases" the offset after an elapsed period of time.

Figure 3:
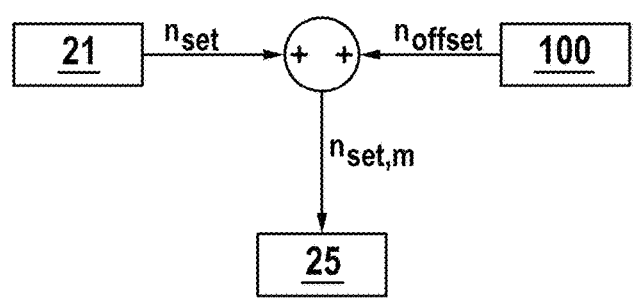
FIG. 3 shows a schematic representation of the method according to the invention for operating a wind turbine.

The method according to the invention for operating a wind turbine is shown schematically in FIG. 3. The rotational-speed closed-loop control system 21 outputs a setpoint rotational-speed signal $n_{set}$. Added to this, at an addition element, is an offset signal $n_{offset}$ that is generated by the offset module 100. The result, the modified setpoint rotational-speed signal $n_{set,m}$, is transferred as a reference value to the power open-loop control system 25.

Figure 4A:
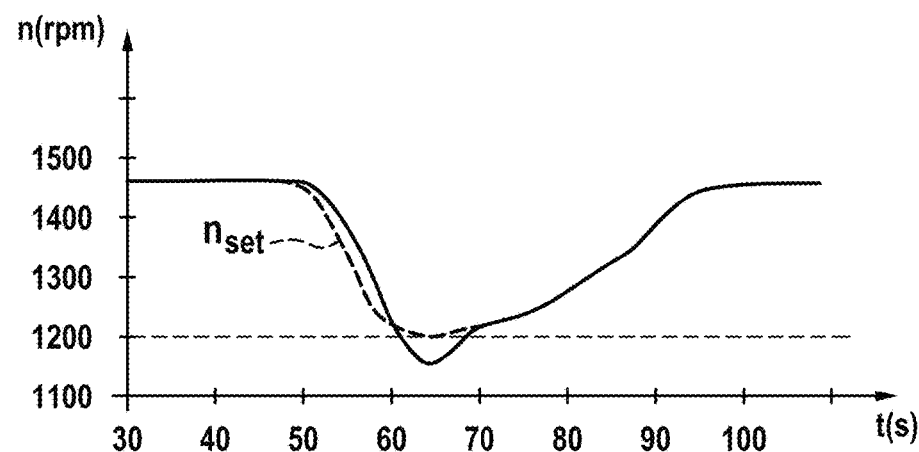
FIGS. 4a to 4c show rotational-speed diagrams from the prior art (FIG. 4a), from the wind turbine according to the invention (FIG. 4b), and from the offset signal according to the invention (FIG. 4c)

For a wind turbine for which there is a request for support power, the method shown in FIG. 4a ensues from the prior art. In this case, the wind turbine provides a requested additional power, at the instant t=50 seconds, for 10 seconds. This is effected by a continuous drop in the rotational speed in this region. As a result of the drop in rotational speed, the kinetic energy in the wind rotor 12 is reduced, the power resulting therefrom is supplied, as additional power, to the generator and converter 14, 15, and output, as primary control power, via the line 17. At the instant t=60, the wind turbine changes back to a normal state, and gradually restores the operating state that existed before the provision of the additional power. Although the setpoint rotational-speed value $n_{set}$ does not fall below a value of 1200 rpm (broken line), the actual rotational speed (unbroken line) in FIG. 4a shows a clear undershoot of the actual rotational speed.

Figure 4B:
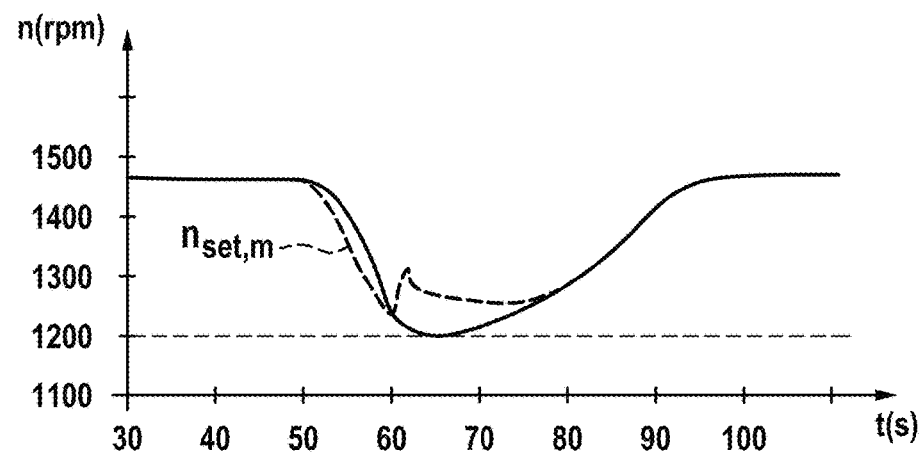
Figure 4C:
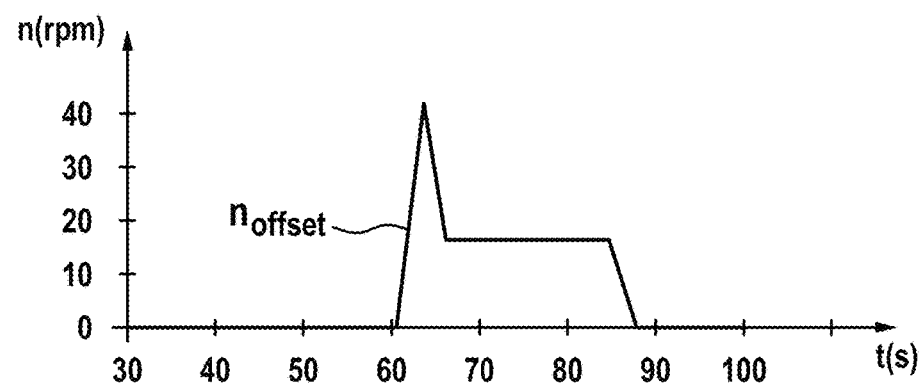

It is possible to remedy the problem of the undershooting of the actual rotational speed, and consequently of the power, by a modified setpoint rotational speed $n_{set,m}$ in FIG. 4b. In this case, the offset $n_{offset}$ shown in FIG. 4c is added to the setpoint rotational-speed value $n_{set}$. The offset shows a pronounced rise in the reference rotational speed after the instant t=60 seconds, and therefore after the provision of the additional power by the wind turbine. In this case, the actual rotational speed no longer drops below the rotational speed of 1200 rpm. In comparison with FIG. 4a, the drop in the actual rotational speed has been reduced.

Figure 5A:
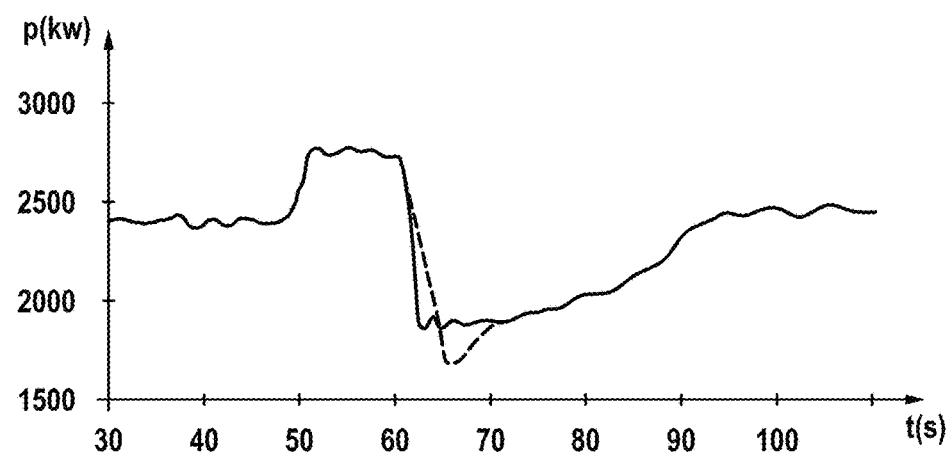
FIGS. 5a to 5b show a power diagram (FIG. 5a) and a torque diagram (FIG. 5b) of the wind turbine according to the invention.
Figure 5B:
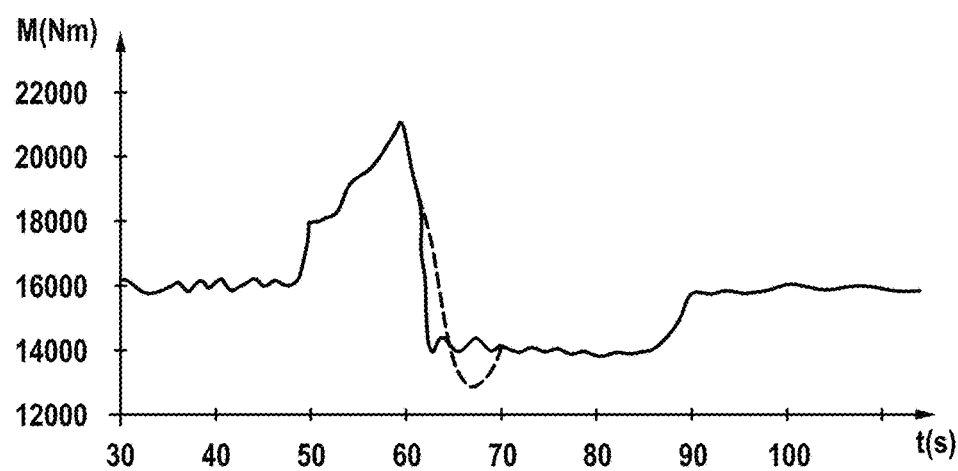

FIGS. 5a and 5b show a power diagram (FIG. 5a) and a torque diagram (FIG. 5b), which correspond to the diagrams shown in FIGS. 4a-4c. As can be seen in FIG. 5a, from an instant t=50 the wind turbine provides additional power for 10 seconds. The torque shown in FIG. 5b increases in this time period. The unbroken line shows the ratio of the parameters with use of the offset according to the invention, as shown in FIGS. 4b and 4c. The broken line, according to the prior art, is plotted for comparison. In this way, the drop in power following provision of additional power can be reduced significantly.

The invention claimed is:

1. A wind turbine comprising:
    a wind rotor,
    a generator that is driven by the wind turbine and that acts in combination with a converter to generate electrical power,
    a rotational-speed closed-loop control system and, acting in combination therewith, a power open-loop control system, the rotational-speed closed-loop control system emitting a setpoint rotational-speed signal ($n_{set}$), wherein an offset module is provided between the rotational-speed closed-loop control system and the power open-loop control system, which is designed to generate an offset signal ($n_{offset}$) and to add it to the setpoint rotational-speed signal ($n_{set}$).

2. The wind turbine of claim 1, wherein the offset module is designed to generate the offset signal ($n_{offset}$) in dependence on a state value.

3. The wind turbine of claim 2, wherein the offset signal ($n_{offset}$) rises after the state value changes over from a state of additional power generation to a normal state.

4. The wind turbine of claim 1, wherein the offset signal ($n_{offset}$) has a step type rise.

5. The wind turbine of claim 1, wherein the offset module comprises a stored power value, and the offset signal ($n_{offset}$) rises in dependence on the stored power value.

6. The wind turbine of claim 5, wherein the stored power value corresponds to a current power value in normal operation of the wind turbine, and is updated upon each changeover of the state value from the normal state to the state of additional power generation.

7. The wind turbine of claims 1, wherein the offset module has a timer that specifies a fixed time interval for the duration of which the offset signal ($n_{offset}$) rises.

8. The wind turbine of claim 7, wherein the time interval defined by the timer does not exceed a duration of 5 seconds.

9. The wind turbine of claim 7, wherein the offset signal ($n_{offset}$) drops after the timer has elapsed.

10. The wind turbine of claim 9, wherein the offset signal ($n_{offset}$) drops to a value that corresponds to the product from the stored power value and a factor.

11. The wind turbine of claim 4, wherein the offset module comprises a slope limiter, which limits a rise and/or the drop of the offset signal ($n_{offset}$).

12. A method for operating a wind turbine that comprises a wind rotor, a generator that is driven by the wind turbine and that acts in combination with a converter to generate electrical power, a rotational-speed closed-loop control system and, a power open-loop control system acting in combination with the rotational-speed closed-loop control system comprising:
   a. outputting of a setpoint rotational-speed signal ($N_{ref}$) by the rotational-speed closed-loop control system,
   b. generating an offset signal ($n_{offset}$),
   c. adding the offset signal ($n_{offset}$) to the setpoint rotational-speed signal ($n_{set}$),
   d. outputting the modified setpoint rotational-speed signal ($n_{set,m}$) to the power open-loop control system.

13. The method of claim 12, wherein the wind turbine as claimed in claim 1 is used.

* * * * *